Patented May 8, 1934

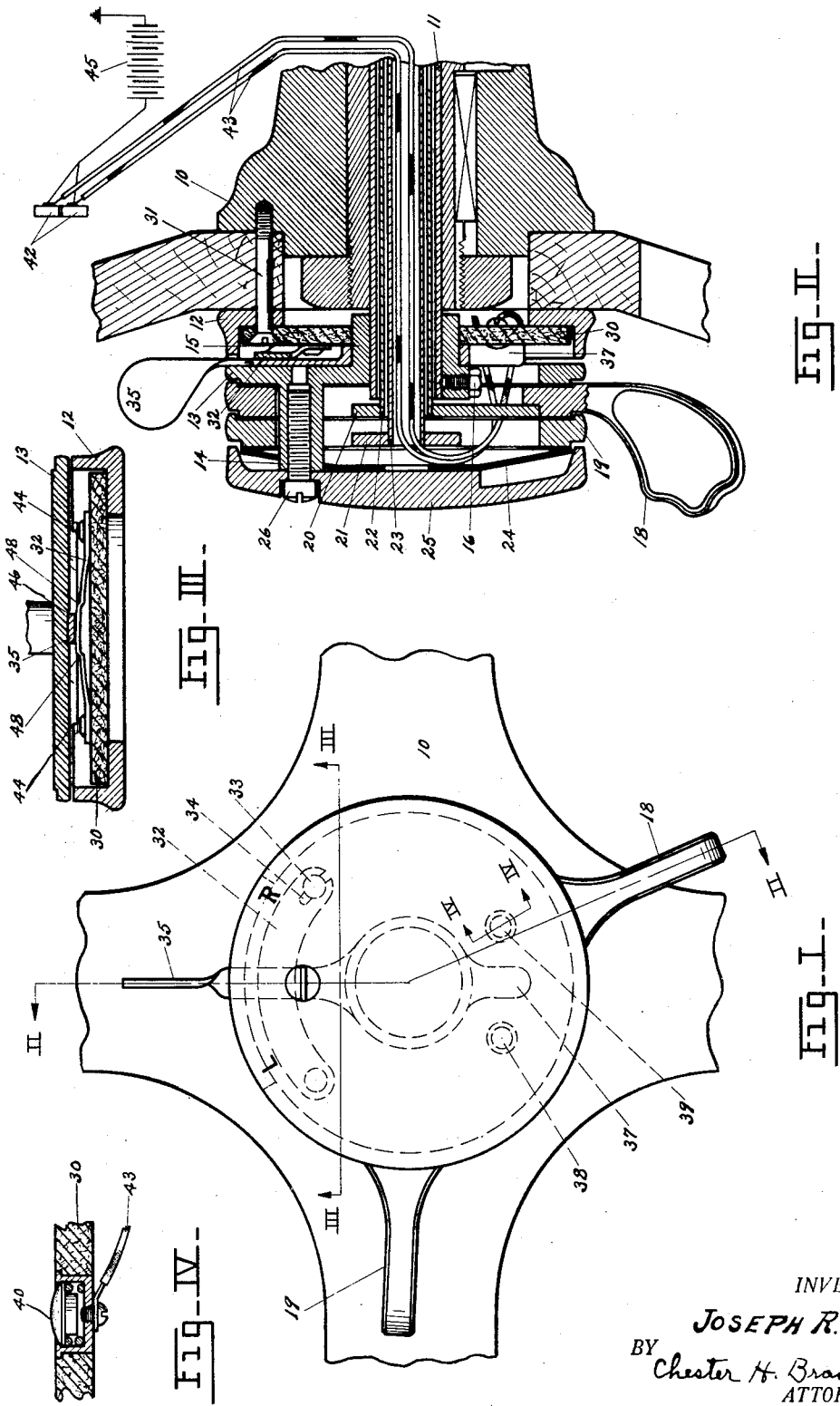

1,958,057

UNITED STATES PATENT OFFICE 1,958,057

SIGNAL CONTROL

Joseph R. Mares, Toledo, Ohio, assignor to The Willys Overland Co., Toledo, Ohio, a corporation of Ohio Application November 4, 1927, Serial No. 231,007

3 Claims. (Cl. 200—59)

My invention relates to direction signalling devices for automobiles, and it has particular relation to devices of the above designated class in which the operation of the signalling unit is partially automatic.

One object of the invention is to provide an electrical direction indicating signal which upon energization, will continue to function until the vehicle has started or completed the change in direction of travel.

It is a further object of the invention to provide a signalling device which will be rendered inoperative after the vehicle has negotiated the turn, without attention from the driver. Another object of the invention is to provide a convenient yet simple combination of elements which will function to convey information to cars in the rear, and at the same time to avoid misinformation by reason of neglect or inadvertence of the driver.

According to the present invention, there is provided a combination of mechanical and electrical elements which include appropriate tail lights that will inform drivers in the rear of the car of a contemplated change in direction of travel. These lights are connected by a suitable wiring arrangement to a manually operated switch that is within the control of the driver. The arrangement of the elements in combination with the steering mechanism is such that after the change in direction of travel is practically completed and the steering wheel is being rotated back to its normal position, the electrical circuit that includes the lights will be broken automatically.

A better understanding of the principles of my invention may be had by referring to the drawing, in which Figure I is a plan view of a portion of the steering mechanism and switch control of an embodiment of my invention which may be preferred.

Fig. II is an elevational view in section of the structure illustrated in Fig. I, taken along the line II—II, and includes a diagrammatic showing of an electrical circuit in combination with the switch.

Fig. III is a sectional view taken along line III—III in Fig. I, and

Fig. IV is an enlarged sectional view of a contact point taken along the line IV—IV of Fig. 1.

In practicing the invention there is provided a steering wheel 10 including a plurality of spokes and a hub portion which is mounted to rotate freely about a stationary tube 11 similar to the supporting tube ordinarily used with the spark and throttle controls. The throttle and spark control for the automobile function independently of the signalling device, but for convenience are incorporated together, forming a portion of the cap or hub of the wheel. Among the elements comprising the spark and throttle control are a flanged annular base member 12 which engages the spokes of the steering wheel, a disc member 13 having a tapped vertical post 14 and an extended portion 15 formed integrally therewith and which is secured by means of a set screw 16 to the stationary tube 11. A spark and a throttle disc 18 and 19 respectively, rest one upon the other and include individual central annular portions 20 and 21 each of which is secured rigidly to an individual tube 22 and 23 respectively, that is movable with respect to the other and concentric with respect to the tube. A dished spring member 24 is positioned between the upper throttle member and a cap 25 that is held stationary by a screw 26 which is fitted in the tapped post 14. Details of construction of this portion of the steering mechanism are well known in the art and need not be further described.

The signal switch is incorporated in this structure without enlarging the same by providing a washer 30 formed of a dielectric material which is rested within the flanged base member 12 and is secured thereto by means of a screw 31. An arcuate spring member 32 having a shouldered central portion, as illustrated in Fig. III, is secured to the dielectric member at one end and is adapted to move axially of the steering column by reason of a guide pin 33 which is positioned within a slot 34 formed in the opposite end thereof. The spring is engageable with the lower side of a signal switch arm 35 which is free to rotate about the hub 15 and is maintained in slidable relation with the dielectric disc. An extended portion of the switch arm 37 contacts with either one of two electrical contact points 38 and 39. The detailed construction of the points is better illustrated in Fig. IV which in its essentials includes a resiliently supported contact member 40 which is lodged within the dielectric disc and is maintained in electrical communication with one of two direction indicating lights 42 in the rear of the vehicle by means of a wire 43.

The limits of rotation of the switch arm are defined by shoulders 44 formed in the flanged member. When the arm is abutted against either shoulder the projected portion engages a corresponding contact member 38 or 39 which results in establishing an electrical circuit from a battery 45 which is grounded at one terminal, through the lever arm 35 which is likewise grounded and which is engageable with one of the contact points 40 that are supported in the dielectric disc and are connected to the lights 42 by the wire 43.

When the operator desires to make a right turn, the lever 35 is shifted in a clockwise direction until it abuts the shoulder 44. This establishes an electrical circuit through the signal light 42, which in turn conveys the necessary information to those in the rear. The current flows from the battery through the light to the contact point 38 by way of one of the wires 43 and finally to the lever 35 which is grounded to the battery.

Since the arm 35 is firmly abutted against the shoulder, clockwise movement of the steering mechanism for the purpose of negotiating the right turn will not disturb the position of the arm. During this clockwise movement, the spring member 32 will be depressed slightly as it passes the arm 35. It may be noted that the position of the arm remains secure even though the steering mechanism may be rotated more than one complete revolution, since the spring member can escape the arm any number of times. During this clockwise movement of spring member the signal remains lighted.

After the right turn of the vehicle is substantially completed the driver rotates the steering mechanism in a counterclockwise direction in order to straighten the wheels and, coincidentally, return the arm 35 to its normal position within the indentured portion 46 of the disc 13. During the counterclockwise movement of the steering mechanism, the shoulder 48 formed in the central portion of the spring 38 will engage arm 35 and rotate it from the shoulder 44 to the indenture 46. As soon as the arm is flush with the recess 46, it will spring upwardly therein by reason of its own resilient quality, aided by that of the spring member 32. The arm will then remain within the recess 46 until it is again shifted manually by the operator for the purpose of making another turn.

It will be noted that the steering mechanism may be rotated in a counterclockwise direction more than one complete turn without interfering with the proper functioning of the control device. Under such circumstances, during the first turn the arm 35 will be brought to its normal position where it will remain throughout the last complete turn. When the driver is ready to make another turn, to the left, for example, he will depress the lever slightly and shift it in a counter-clockwise direction until it abuts the corresponding shoulder 44 where it will remain until the steering mechanism is again rotated in a clockwise direction at the completion of the left turn. The operation of the device in making a left turn is similar in all respects to that above described in connection with a right turn. It will be observed that the signal light remains lighted regardless of how many complete turns of the steering mechanism are necessary. It will also be observed that the signal remains lighted until after the change in direction is substantially completed and the steering mechanism is being returned to its normal position.

Although there is described but a single embodiment of the principles of the invention, it will be apparent that this is merely by way of example and that they are not so limited but are susceptible to many modifications without departing from the scope of the invention, and I desire therefore that they be limited only as indicated in the appended claims.

I claim:

1. In combination with a vehicle steering wheel, a signal switch for controlling a plurality of independent electrical circuits, a pivotable circuit closing member, a stationary surface co-operatively disposed with respect to said member and engaged by said member, said surface being recessed to maintain the arm in an open circuit position during the movement of the wheel the member being manually operable out of the recess, and means co-operative with the wheel including an arcuate spring member having a shoulder portion for engaging and returning the circuit closing member to the recess automatically.

2. In combination with a vehicle steering wheel, a signal switch for controlling a plurality of independent electrical circuits, a circuit closing member, a stationary surface co-operatively disposed with respect to said member and engaged by said member, said surface being recessed to maintain the arm in an open circuit position, the arm being manually operable out of the recess, a resilient member secured to the wheel, said member having a shoulder portion engageable with the circuit closing member for returning said member to the recess automatically, and said arm being adapted to be retained within said recess during the movement of the wheel.

3. In combination with a vehicle steering wheel, a signal switch for controlling a plurality of independent electrical circuits, a circuit closing arm manually actuated in a closed circuit position, abutting means adapted to be engaged by the arm for defining the extent of movement of said arm, means adapted to receive and retain the arm in an open circuit position during all operative movements of the wheel, resilient means co-operative with the wheel, said resilient means including a projection for returning the arm to open circuit position said resilient means being flexed and so disposed as to escape the arm while in an open circuit position.

JOSEPH R. MARES.